United States Patent Office 3,215,752
Patented Nov. 2, 1965

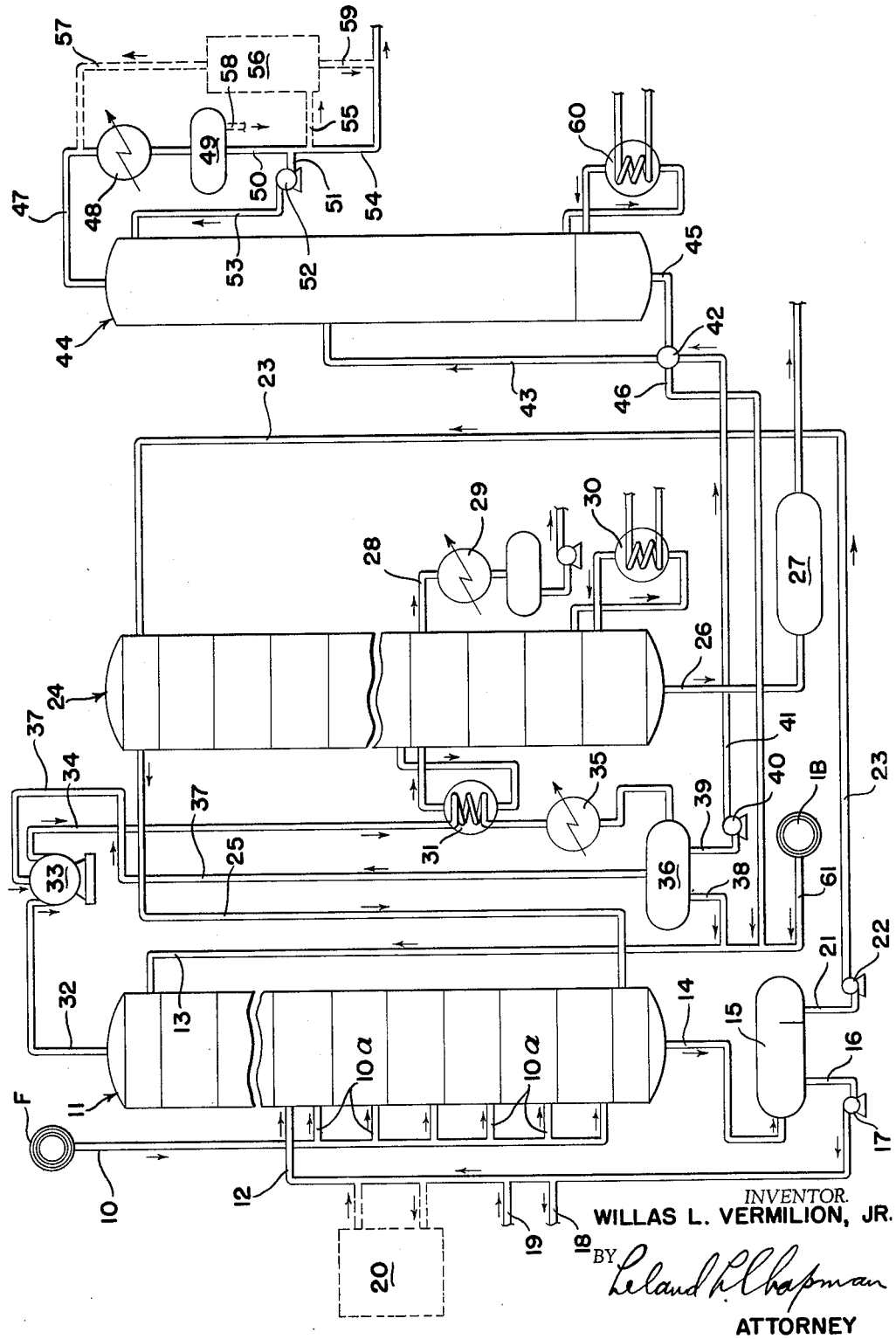

3,215,752
ALKYLATION PROCESS
Willas L. Vermilion, Jr., Lakewood, Ohio, assignor to The Standard Oil Company, Cleveland, Ohio, a corporation of Ohio
Filed May 3, 1963, Ser. No. 277,734
2 Claims. (Cl. 260—683.48)

The present invention relates to an improved process for alkylating saturated hydrocarbons containing tertiary carbon atoms, with olefins.

The invention is particularly applicable to the alkylation of isobutane with olefinically unsaturated $C_3$, $C_4$, and $C_5$ hydrocarbons in the presence of an acid catalyst such as sulphuric, hydrofluoric acids, or hydrogen chloride promoted aluminum chloride, to produce saturated hydrocarbons boiling within the gasoline boiling range. While the following discussion will concern itself with the process as applied to the alkylation of isobutane, it is to be understood that the process is also applicable to the alkylation of other tertiary paraffinic and naphthenic hydrocarbons.

In recent years there has been a big shift in alkylate utilization from aviation fuels to automotive fuels. This has brought about an increase in alkylate capacity of from 50,000 to 70,000 barrels a year and in addition, has induced the smaller refiners who supply automotive fuels but not aviation fuels to enter the alkylate manufacturing business.

Because of the greater competition and lower profit margin in automotive fuels vis-a-vis aviation fuels, the historically high alkylate plant and operating costs have become a matter of great concern. The small refiner who is desirous of building an alkylate plant must compete with a large refiner who may well be operating a plant the cost of which has been largely depreciated over the years. Similarly a large refiner who is desirous of expanding his alkylate capacity would have to incur the high cost of a new conventional alkylate plant. Thus there is a real and substantial need in the industry for an alkylate process which can be conducted in a plant costing less than conventional plants and which can produce alkylate at far lower operating costs than conventional processes.

The present invention fills this need. It has been calculated that the cost of a plant for the process of this invention is only about 50–75% of the cost of a conventional plant of the same capacity, and the less costly plant would produce a higher quality alkylate. To produce an alkylate comparable in quality to that made in a conventional plant, the new plant cost would be even lower. Moreover, the operating cost of the inventive process can be as low as one half that of a conventional process.

These and other advantages are accomplished by the process of the present invention, wherein the alkylation reaction is conducted in a zone of a rectifying column maintained under such operating conditions that isobutane constitutes from 85–95% of the hydrocarbons present in the reaction zone, while the reflux stream to the rectifying column constitutes from 90–100% isobutane.

By conducting the reaction in a rectifying column, it is possible to instantaneously separate reaction product as formed, and unreactable light ends in the feed, from the reactants, while utilizing the heat of reaction as part of the thermal requirement to effect these separations. This reserves the reaction zone for reactants and catalyst to an extent not possible according to conventional processes. More importantly, by removing a mixture of unreactable light ends and unreacted excess isobutane as overhead from the rectifying column, and recovering isobutane from the mixture and recycling 90–100% isobutane as reflux to the column, it is possible to consistently provide an alkylate product in very high yields and of a superior quality, not attainable by conventional processing techniques.

A better understanding of the invention will be gained from the following detailed description thereof in connection with the attached drawing which represents diagrammatically a specific embodiment of a process scheme and apparatus which may be employed in practicing the invention.

This discussion will concern itself with the alkylation of isobutane with olefinically unsaturated hydrocarbons using a typical feed material, such as a $C_4$ cut from a cracking operation. It is to be understood however that the process is equally applicable to the alkylation of other tertiary paraffinic and naphthenic hydrocarbons.

Referring to the drawing from which valving, certain heat exchangers, etc. not essential to an understanding of the invention, have for simplicity been omitted; a feed stock containing primarily a mixture of $C_4$ hydrocarbons passes from source F through line 10 and is introduced into the reactor-rectifier 11 through a plurality of side ports 10a. Circulating acid is introduced through line 12 at a point just above top feed port 10a. The vertical limits of the reaction zone within reactor-rectifier 11 will generally extend from circulating acid line 12 at the top, to the lowest feed port 10a at the bottom. Accordingly, feed and acid are introduced directly into the reaction zone, with the feed being introduced at a plurality of points along the vertical length of the zone.

A reflux stream containing from 90–100% isobutane is introduced into the top of reactor-rectifier 11 through line 13.

As the reaction proceeds, alkylate, acid catalyst, some reactants, and any heavier unreactable hydrocarbons in the feed such as n-butane, move down the reactor-rectifier 11 and are withdrawn through line 14 to acid settling drum 15. Here the hydrocarbon and acid phases are separated. The circulating acid is removed through line 16 by acid circulating pump 17. Where sulphuric acid is used as the catalyst, the spent acid is removed through line 18 and either discarded or regenerated by conventional means not shown; fresh sulphuric acid enters through line 19 and travels into line 12 to the upper portion of reactor-rectifier 11. Where hydrofluoric acid is used as the catalyst, an internal acid regeneration unit 20 is provided in parallel with acid feed line 12. Fresh hydrofluoric acid is added through line 19.

Returning to acid settling drum 15, the hydrocarbon phase is removed therefrom through line 21 by pump 22 and is carried through line 23 to the top of stripping column 24. In this column, reactants are stripped from the n-butane and alkylate. The stripped reactants form an overhead of stripping column 24, and are returned through line 25 to a point just below the reaction zone of reactor-rectifier 11.

The mixture of n-butane and alkylate may be recovered as a stripper bottoms product, in which case the mixture is transferred through line 26 to alkylate treating unit 27. The alkylate may be further treated in accordance with conventional practices, e.g., neutralization, debutanization, solvent extraction, fractionation, etc., none of which form a part of the present invention.

Alternatively, at least a partial separation of n-butane and alkylate may be effected in connection with the stripping operation in column 24. This can be accomplished by withdrawing at least a portion of the n-butane through line 28, and cooling same in condenser 29. Since the n-butane is considerably more volatile than the alkylate, removal of n-butane will affect, and hence may be used to control the vapor pressure on stripper bottoms product.

Stripping column 24 is provided with a reboiler 30 which drives the stripping column and reactor-rectifier 11. An auxiliary reboiler 31 may also be provided, and this feature will be discussed more fully hereinafter.

The overhead vapors from reactor-rectifier 11, containing primarily isobutane in admixture with non-reactive light ends of the feed, such as propane, is fed through line 32 to compressor 33. The compressed liquid hydrocarbons travel through line 34 to auxiliary reboiler 31, which helps drive stripping column 24 and reactor-rectifier 11, and thence through cooler 35 to flash-and-reflux drum 36. The material flashed in drum 36 is returned through line 37 to compressor 33. The bulk of the liquid material in drum 36, containing primarily isobutane, is routed through line 38 into reflux line 13 and enters the top of reactor-rectifier 11 as an isobutane rich reflux stream. A portion of the contents of flash-and-reflux drum 36 passes through line 39, pump 40, line 41, heat exchanger 42, line 43, and into depropanizer 44 where propane is separated from isobutane. The isobutane bottoms from the depropanizer are returned as reflux to the top of the reactor-rectifier through line 45, heat exchanger 42, line 46 and line 13. The propane overhead is carried off through line 47, condenser 48, hold tank 49 and line 50. A portion of this stream is recycled back to the depropanizer as reflux through line 51, pump 52 and line 53 while the remainder passes through line 54 and is recovered as a propane product.

Where hydrofluoric acid is used as a catalyst, additional means are provided to strip from the depropanizer overhead, acid carried through the system. According to this modification, the propane-hydrofluoric acid mixture in line 50, save for a portion recycled to the depropanizer through line 51, is diverted through (dotted) line 55 to HF stripper 56. The acid overhead from stripper 56 is returned through (dotted) line 57 to line 47, condenser 48 and hold tank 49, where the acid is removed as a separate phase via (dotted) line 58. The propane bottoms from the stripper 56 is removed through (dotted) line 59, and carried off through propane product line 54.

The depropanizer 44 is provided with a reboiler 60 to drive the separatory process.

Make-up isobutane as may be required to maintain a reflux to the reactor-rectifier composed of 90–100% isobutane as well as to maintain an isobutane concentration of 85–95% of hydrocarbons in the reaction zone, is supplied from source IB through line 61 to reflux line 13.

Summarizing the novel features of the process of this invention, the alkylation reaction is conducted under rectifying conditions which permits an instantaneous separation of non-reactive light ends in the feed, and reaction product, from the reactants and catalyst. This separation reserves the reaction zone for reactants and catalyst which in turn contributes to the attainment, desirably of an extremely high isobutane concentration in the reacton zone, amounting to 85–95% of the hydrocarbons present. The effect of this high isobutane concentration is to minimize polymerization and other undesirable side reaction which attend a conventional alkylation process where the isobutane concentration in the reaction zone is generally within the range of 60–75%.

Another feature of the invention which contributes to the attainment of exceptionally high isobutane concentration in the reaction zone, is the provision of a recycle stream to the reactor-rectifier, which contains isobutane in a concentration within the range of 90–100%. This recycle stream is made up by combining variously, as economics dictate:

(a) The reactor-rectifier overhead stream after it has been compressed, cooled and flashed;

(b) The stream treated as in (a) which has additionally been depropanized;

(c) An external source of isobutane.

Just which of these streams are combined and in what proportions to make up a 90–100% isobutane recycle stream to the reactor-rectifier, will be determined by the composition of the feed to the reaction zone, economics, and other considerations.

Another feature of the present invention is that the heat of the alkylation reaction is utilized as a part of the thermal requirement needed to effect a separation among alkylate, reactants, and non-reactive light ends in the feed.

Still another feature of the invention is that the compressed overhead stream from the reactor-rectifier may be used to supply part of the heat requirement needed to reboil the stripping operation; this in turn supplies part of the heat requirement of the reactor-rectifier.

Yet another feature of the present invention is the introduction of feed directly into the reaction zone of the reactor-rectifier, at a plurality of points along the height of the zone. This insures substantially uniform dispersion of the olefinic reactant throughout the reaction mix and thus reduces the tendency toward polymerization and other undesirable side reactions.

While the attached drawing shows reaction-rectifier 11 and stripping column 24 as separate units, it is to be understood that the process of the invention can also be carried out with both of these units combined as a single vertical tower in which the reactor-rectifier forms the upper portion and the stripper forms the lower portion. Where these units are combined in a single tower, the acid setting facility 15 may either be a separate unit as shown or it may be constructed internally of the tower. Economics will play the largest role in determining the preferred design for a given plant site.

In order to achieve the various desideratum of the present invention, the operating conditions for reactor-rectifier should be controlled to meet the following parameters:

Temperatures:
    Top of rectifier, ° F. _____ 25–55
    Reaction zone:
        $H_2SO_4$, ° F. _____ 30–50
        HF, ° F. _____ 30–90
Pressure, p.s.i.g. _____ 0–30
Acid concentration in reaction zone:
    $H_2SO_4$, wt. percent _____ 85–97
    HF, wt. percent _____ 75–95
Vol. percent isobutane in hydrocarbon phase in reaction zone _____ 85–95
Vol. percent isobutane in reflux stream to rectifier _____ 90–100

*Example*

The process of the invention was run in a laboratory scale set-up corresponding to that shown in the attached drawing, with the following exceptions: Since sulphuric acid was used as the catalyst, the HF regenerator 20 and the HF stripper 56 were omitted. A mixture of n-butane and alkylate was recovered as the bottoms of stripper 24, hence side draw 28, condenser 29 and the other n-butane recovery means were omitted.

The more significant operating temperatures and pressures were maintained as follows:

| Location | Temperature, ° F. | Pressure, p.s.i.g. |
|---|---|---|
| Reactor-rectifier (11): | | |
|   Reaction zone | 40 | 10 |
|   Rectifier top | 38 | 10 |
| Compressed rectifier: | | |
|   Overhead (line 34) | 120 | 80 |
| Flash-and-reflux drum (36) | 58 | 25 |
| Stripping column (24): | | |
|   Middle | 75 | 10 |
|   Bottom | 140 | 10 |
| Depropanizer (44): | | |
|   Top | 119 | 230 |
|   Bottom | 190 | 230 |

Other operating conditions included the following:

| | |
|---|---|
| Wt. percent concentration $H_2SO_4$ in reaction zone | 92 |
| Vol. percent isobutane in hydrocarbon phase in reaction zone (average) | 90 |
| Vol. percent isobutane in reflux stream to rectifier | 98 |

Feed:

| | |
|---|---|
| Vol. percent alkylatable reactants | 37.1 |
| Ratio of isobutane to olefins | 1.21 |

The following table shows the composition of the feed as well as the composition of various streams in the process. In each instance, concentrations are expressed in mol-fractions.

| Hydrocarbon Type | Feed | Reactor-Rectifier Reaction Zone (Avg.) | Reactor-Rectifier Overhead | Reactor-Rectifier Reflux [1] | Propane Product | Stripper Bottoms [2] |
|---|---|---|---|---|---|---|
| $C_3$ | .022 | | .020 | .019 | .980 | |
| $C_3^=$ | .021 | | | | | |
| $iC_4$ | .426 | .916 | .977 | .978 | .020 | .009 |
| $C_4^=$ | .394 | | .003 | .003 | | |
| $nC_4$ | .106 | .048 | | | | .186 |
| $iC_5$ | .023 | .008 | | | | .160 |
| $C_5^=$ | .008 | | | | | |
| $nC_5$ | | | | | | |
| $C_6+$ | | .028 | | | | .645 |

[1] Ratio of isobutane to olefin in feed was sufficiently high so that it was unnecessary to add make-up isobutane to this stream.
[2] n-Butane side draw in stripper column not in operation.

These data show excellent conversion of the alkylatable $C_3$, $C_4$, and $C_5$ components of the feed to a $C_6+$ alkylate product. It should be noted that the average isobutane concentration in the reaction zone was 90 vol. percent of the hydrocarbon phase, and the reflux to the reactor-rectifier contained 98 vol. percent isobutane.

From the foregoing description, it will be apparent to those skilled in the art that various modifications may be made without departing from the spirit and scope of the present invention as set forth in the following claims.

I claim:

1. In a process for alkylating a saturated hydrocarbon selected from the group consisting of paraffinic and naphthenic hydrocarbons containing tertiary carbon atoms, with olefins in the presence of an acid catalyst selected from the group consisting of sulphuric and hydrofluoric acids, which includes the steps of:
   introducing the reactants and catalyst into a portion of a rectifying column, said portion being referred to hereinafter as a reaction zone and constituting the only reaction zone in said column;
   maintaining the concentration of said saturated hydrocarbon in said reaction zone at a value within the range of 85–95% of total hydrocarbons present;
   removing an alkylate rich stream from said reaction zone and down said rectifying column;
   removing a vapor stream rich in said saturated hydrocarbon from said reaction zone and up said rectifying column; and
   recycling as reflux to the top of said rectifying column, a stream containing 90–100% of said saturated hydrocarbon, the improvement comprising the steps of passing said vapor rich stream directly to a compressor and compressing same, thereby raising its temperature level and heat content, and utilizing a portion of said heat content to drive said rectifying column.

2. In a process for alkylating in the presence of an acid catalyst selected from the group consisting of sulphuric and hydrofluoric acids, the isobutane contained in a hydrocarbon mixture comprising isobutane, n-butane, butenes, and a minor amount of non-reactive lower-boiling materials, which includes the steps of:
   introducing said hydrocarbon mixture and acid catalyst into a portion of a rectifying column, said portion being referred to hereinafter as a reaction zone and constituting the only reaction zone in said column;
   maintaining said reaction zone at a pressure within the range of 0–30 p.s.i.g. and a temperature within the range of 30–50° F. where the catalyst is sulphuric acid and 30–90° F. where the catalyst is hydrofluoric acid;
   maintaining the isobutane concentration in said reaction zone at a value within the range of 85–95% of total hydrocarbons present;
   removing from said reaction zone and down said rectifying column a mixture comprising alkylate, n-butane, and catalyst;
   removing from said reaction zone and up and out of said rectifying column as an overhead stream, a mixture comprising isobutane and said non-reactive lower boiling materials;
   separating at least a portion of said non-reactive lower-boiling materials from said overhead stream, to produce an isobutane enriched stream; and
   recycling said isobutane enriched stream to the top of said rectifying column in a reflux stream containing 90–100% isobutane,
   the improvement comprising the steps of passing said overhead stream directly to, and prior to the separation of non-reactive, lower-boiling materials therefrom, a compressor and compressing said overhead stream, thereby raising the temperature level and increasing the heat content of said stream, and transferring by heat exchange a portion of the heat content of said stream to drive said rectifying column.

References Cited by the Examiner

UNITED STATES PATENTS

| | | | |
|---|---|---|---|
| 2,365,426 | 12/44 | Molique | 260—683.59 |
| 2,418,146 | 4/47 | Upham | 260—683.53 |
| 2,431,166 | 11/47 | Buell et al. | 260—683.58 |
| 2,471,211 | 5/49 | Hadden | 260—683.52 |
| 3,162,694 | 12/64 | Beavon | 260—683.62 |
| 3,187,066 | 6/65 | Nathan | 260—683.62 |

OTHER REFERENCES

Kobe and McKetta, Advances in Petroleum Chemistry and Refining, vol. II, Interscience, N.Y., 1959.

References Cited by the Applicant

The Chemistry of Petroleum Hydrocarbons, vol. 3, pages 32 and 33, Reinhold Publishing Corporation (1955).

Isomerization of Pure Hydrocarbons, pages 218–243, Reinhold Publishing Corp. (1942).

The Petroleum Handbook, Shell International Petroleum Co. (1959).

Petroleum Refinery Engineering, Third Edition, pages 624, 626, 627, 662 and 663, McGraw-Hill Book Co., Inc. (1949).

DELBERT E. GANTZ, *Primary Examiner.*

ALPHONSO D. SULLIVAN, *Examiner.*